Feb. 16, 1943.  A. A. JOHNSON  2,311,395
AUTOMOBILE ACCESSORY
Filed Dec. 14, 1938

INVENTOR

Patented Feb. 16, 1943

2,311,395

UNITED STATES PATENT OFFICE 2,311,395

AUTOMOBILE ACCESSORY

Arthur A. Johnson, Bridgeport, Conn., assignor to Casco Products Corporation, Bridgeport, Conn., a corporation of Connecticut Application December 14, 1938, Serial No. 245,576

8 Claims. (Cl. 177—311.5)

This invention relates to an electric signaling means for use on motor vehicles, and, more particularly, to an automatic signal for warning the driver of a motor vehicle when he has reached a predetermined speed limit above which he does not desire to drive.

Various devices have been proposed in the past for controlling and indicating the speed of motor vehicles to the end that a vehicle would not be driven above some predetermined speed. These devices have taken several forms and generally have consisted of devices which, by means of a throttle control, positively prevented the vehicle from obtaining a speed over the one predetermined, or devices designed to give a warning signal when the vehicle attained the preselected speed so that the driver could then reduce the speed of the vehicle.

The first-mentioned devices gave rise to a very serious difficulty for the reason that it was sometimes necessary, due to traffic conditions, to operate the vehicle at a speed exceeding the one predetermined and which could not be done with a vehicle having such a control device attached.

The device of the present invention is one that gives a warning signal when the vehicle is driven in excess of a predetermined speed, and is designed to give a convenient speed indication and yet enable the driver to fully regulate the motor so that he may, should traffic conditions warrant, exceed the speed at which the device has been set to give the signal.

In the previously proposed signal means for indicating maximum speeds to the driver of the vehicle, it was difficult to adjust these devices for varying the speed at which the signal was given. If a convenient adjustment was provided on these devices, it generally consisted of a flexible cable, such as a Bowden wire, interconnecting the speed-responsive means and an adjustment means located adjacent the driving position of a vehicle, whereby some mechanical adjustment could be effected. This gave rise to a serious difficulty in the installation of these devices, for generally the speed-responsive means was located at some point on the vehicle remote from the driving position and required the use of a substantial length of flexible cable, which had to be installed so as to be fully movable under the actuation of the adjusting means.

In the broader aspects of the present invention, the actuation of the signal is controlled by the electrical balance of a resistance bridge governed by a means responsive to the speed of the vehicle. This speed-responsive means, according to the herein disclosed invention, comprises a vane pivotally mounted on the cylinder head of a motor to the rear of the usual fan driven thereby so that the vane will be actuated by the wind pressure created by the fan.

The vane, according to the present invention, is designed to control the value of a variable resistance in an arm of the resistance bridge. This resistance, as it is varied by the changes in speed of the vehicle, will correspondingly change the electrical balance of the bridge. The bridge is so designed that, up to a predetermined speed, the speed-responsive resistance will cause a difference of potential across the terminals of the bridge which will cause current to flow in a control circuit in on direction, which flow is reversed by the speed-responsive resistance assuming a value which will change the potential difference at the terminals of the bridge in response to a speed in excess of the predetermined speed.

The present invention also includes a means remote from the vane for adjusting the speed at which the vane will cause an actuation of the signal, and, as herein disclosed, comprises a manually variable resistance in another arm of the bridge. The manually variable resistance is conveniently mounted adjacent the driver in the driving compartment of the vehicle to the end that the adjustment may be made while the vehicle is in motion. This manually variable resistance, as it is opposed to the resistance governed by the speed of the vehicle, comprises a means for modifying the effect of the latter resistance on the electrical balance of the bridge, and provides a means for manually varying the value at which the speed-responsive resistance will cause an unbalance in the bridge necessary to actuate the signal-controlling element.

According to the present invention, no attempt is made at calibration of the signal means of the present invention against the speedometer, and, therefore, the same signaling means may be used with many different speedometers without any special adaptation of the signaling means to the speedometer.

Furthermore, the device of the present invention, as it is not adapted to the speedometer or any moving part of the vehicle, may be easily and conveniently attached to any vehicle without the necessity of altering in any way the operating mechanism of the vehicle.

In using the device of the present invention, the driver brings the vehicle to the speed in excess of which he does not wish to drive, and then, by adjusting the manually variable resistance, effects the unbalance of the bridge necessary to cause a flow of current across the terminals of the same in the direction in which the signal-controlling element will operate to actuate the signal.

Upon a reduction of speed below the predetermined one, the speed-responsive resistance will vary in value and reverse the potential difference across the terminals of the bridge, and the direction of the current in the control circuit will be reversed causing an operation of the signal-controlling element to its inoperative position. The signal is ineffective, therefore, until the predetermined speed is again exceeded, whereupon the signal warns the driver that the vehicle is again being driven above the maximum speed desired.

If the driver of the vehicle should approach a stretch of highway where the speed limit is increased or reduced, he may, by bringing the vehicle to the speed at which the signal is desired and by simple manipulation again of the manually variable resistance, cause the signal to become effective at either the lower or higher speed.

The adjusting means of the present invention obviates the serious difficulties presented by the use of the flexible cables to effect the mechanical adjustment of the previously proposed devices, as the wires may be lead from the resistance controlled by the vane in the motor compartment to the resistance bridge in a manner well known in the art, and the installation of the device is, therefore, greatly facilitated.

Other features and advantages will hereinafter appear.

Figure 2:
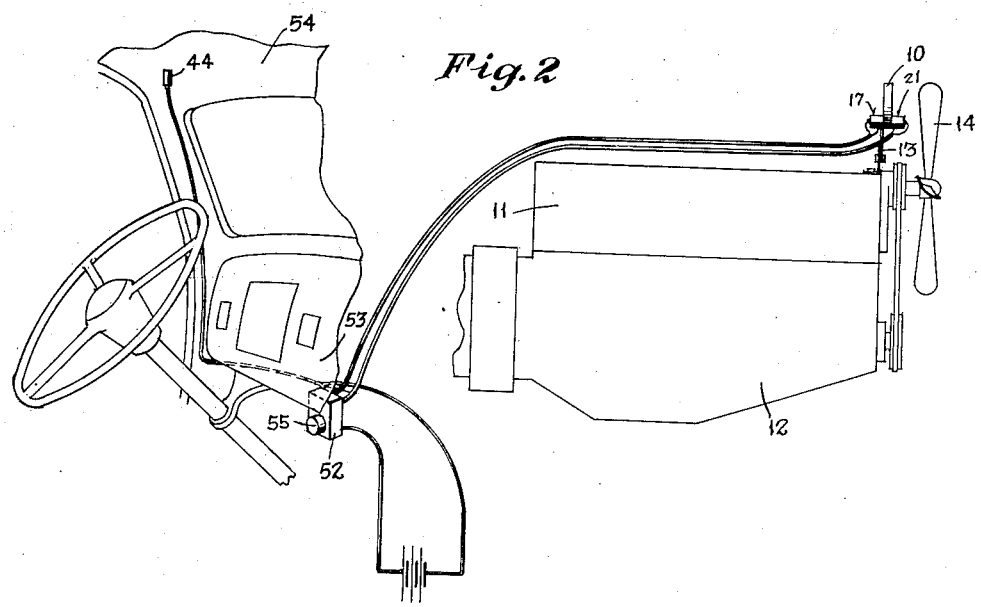
Fig. 2 is a diagrammatic view of a motor having a device of the present invention mounted thereon showing the position of the remote control device and the signaling means employed.

The present preferred embodiment of the invention, referring now particularly to Fig. 2, comprises a casing 10 mounted to the cylinder head 11 of a motor block 12 by an extensible bracket 13 to the rear of the usual fan 14 of the cooling system of the vehicle. A vane 15 is pivotally mounted within the casing 10, so as to be responsive to the air currents produced by the fan 14 as the same is driven by the motor 12.

The vane, as it is moved about its pivot 16 by the draft created by the fan, is adapted to govern a variable resistance which may comprise, as herein shown, a carbon pile 17 connected by means of leads 18 and 19 to an arm 20 of a resistance bridge of the Wheatstone type.

In the now preferred form of the invention, a second pile 21 is connected by leads 22 and 23 to a diagonally opposed arm 24 of the bridge. It will be understood that a fixed resistance could be inserted in the arm 24 and the second pile 21 dispensed with, but, in the preferred form of the invention, under movement of the vane the resistance of one pile increases as the other decreases, and a faster change in the electrical balance of the bridge can be effected.

The input terminal A of the bridge is connected by a wire 25 to the ignition switch 26 of the vehicle, which in turn is connected by a wire 27 to the usual storage battery 28 of the vehicle.

The arm 29 of the bridge is provided with a known fixed resistance 30, and the opposite arm 31 has a manually variable resistance 32 connected thereto by leads 33 and 34.

Figure 1:
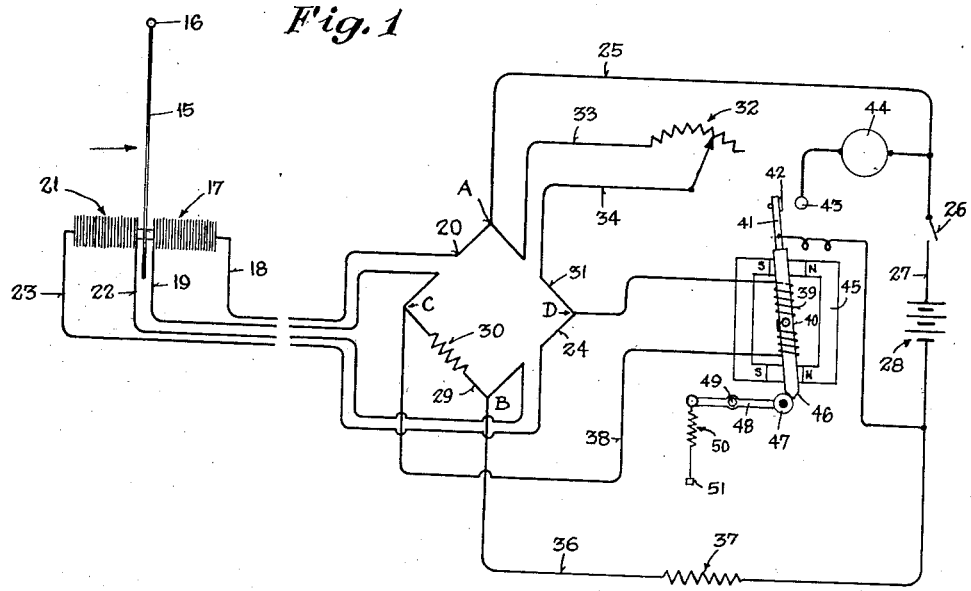
Figure 1 is a diagrammatic illustration of the circuit connections used in the present invention.

The terminal B of the bridge is connected by a wire 36 which includes a calibrating resisttance 37 through some suitable ground to the negative side of the battery 28. The output terminals C and D of the bridge are interconnected by a wire 38 forming a control circuit governing the actuation of the signal. The flow of current through wire 38 across the terminals C and D is, according to the present invention, designed to energize a control element operable to alternate positions, depending on the direction of the flow of current in the wire 38. The control element may be, as herein shown, a polarized relay comprising a coil 39 wound about a core 40, which core carries a switch arm 41 having a contact 42 adapted to engage a contact 43 in a signal circuit which includes a suitable signal 44. The core is pivotally mounted between the poles of the magnet 45, as shown in Fig. 1. The construction is such that current flowing in one direction in wire 38 will actuate the core 40 to one position and cause the signal circuit to be closed while current flowing in the reverse direction will cause the core to reverse its position to open the circuit.

It will be now seen that, when the ignition switch 26 is turned on, a circuit is established from the battery 28 to the bridge, and, as long as the vane 15 is not urged rearwardly about its pivot 16, the resistance afforded by the pile 17 is such that the difference in potential between the terminals C and D of the bridge will cause a flow of current between these terminals in one direction which, as will be understood, will maintain the relay in a position in which the signal will not be actuated. When, however, the vane is urged rearwardly in the direction of the arrow in Fig. 1, the resistance afforded by the pile 17 will be changed in such a manner that the difference in potential between the terminals C and D of the bridge will reverse, and, consequently, the flow of current across these terminals will also reverse. This change in direction of the flow of current will actuate the relay to cause the contact 42 to move into engagement with the contact 43, thereby closing the signal circuit and making the signal 44 effective to warn the driver that the vehicle is being driven in excess of the predetermined speed.

To maintain the switch in either of its alternate positions, the core 40 is provided adjacent the end opposite the switch arm 41 with a cam surface 46 adapted to engage a roller follower 47 carried by the arm 48 pivoted at 49. A contractile spring 50, having one end fixed as at 51, is connected to the end of the arm 48, opposite the follower 47, and tends to urge the follower into engagement with the cam surface 46. As the core 40 is actuated to either of its alternate positions, the cam 46 carried thereby will urge the follower 47 downward against the action of the spring 50 until the high point of the cam passes over the follower whereupon the follower, under the action of spring, will cause the core 40 to snap to the alternate position.

The quick action of the core 40, as it moves from one position to the other due to the cam and follower action, causes the contacts 42 and 43 to be quickly brought into and out of engagement so that the switch is a snap-acting one which will prevent arcing between the contacts and prolong the life of the switch.

In use, it will be seen that the casing 10, by means of the bracket 13, may be very quickly and conveniently mounted on the cylinder head of the motor and that it may be attached to any vehicle without altering in any way any of the moving parts of the same so that the device may be attached by a comparatively unskilled mechanic. The leads connecting the carbon piles may be very easily connected to the resistance bridge, which, together with the variable resistance 32 and the relay, are conveniently housed within a suitable housing 52, secured in some convenient position adjacent the driver such as the instrument panel 53 of the vehicle.

The signal 44 preferably is mounted to the header panel 54 of the vehicle so as to be conspicuous and easily seen by the driver of the same. The signal means employed although preferably comprises a visual signal such as an incandescent lamp yet the same may consist, if desired, of some suitable audible signal such as a small buzzer or bell adapted to be energized by the current supply of the vehicle.

A driver of a vehicle having the device of the present invention attached, if he does not desire to drive over a predetermined speed, for example, of forty-five miles an hour, may bring the vehicle up to that speed and then, by manipulation of the knob 55, adjust the variable resistance 32 to a point where the air currents, produced by the fan when the vehicle is travelling at the predetermined speed, cause the value of the resistance of the carbon pile 17 to be such that the difference in potential between the terminals C and D of the bridge will cause a flow of current across the relay circuit in a direction to actuate the same and close the switch controlling the signal 44. It will be understood that a reduction of the speed will cause the relay to open the switch and the signal will no longer be energized.

The driver may now devote his entire attention to the operation of the vehicle, obviating the necessity of frequently glancing at the speedometer to ascertain the speed of the vehicle, for the signal will now be effective when the car reaches the predetermined speed to warn the driver that he has reached that speed above which he does not wish to drive.

By way of example, again, if the driver should approach a stretch of highway having a different speed limit, he may maintain the speed of the vehicle at the now desired maximum speed, and, by a simple manipulation again of the knob 55, cause the signal to be given at the new maximum speed.

Variations and modifications may be made within the scope of this invention and portions of the improvements may be used without others.

I claim:

1. In a speed-indicating device for vehicles, a signal circuit; a switch therefor; a control circuit; a switch-actuating means in said control circuit adapted to act on and move said switch to alternate positions upon a reverse of current flow through said control circuit; means operable in predetermined relation to the speed of the vehicle; and means operated by said means for reversing the current flow through said control circuit.

2. In a speed-indicating device for vehicles, a Wheatstone bridge; a source of current; means, including a signal, controlled by the direction of flow of current across said bridge; means operable at speeds corresponding to speeds of the vehicle; means actuated by the last-named means for controlling the direction of said flow of current; and means in opposition to said last-named means for modifying the speed at which said control is effected.

3. In a speed-indicating device for vehicles, a Wheatstone bridge; a source of current; means including a signal controlled by the direction of flow of current across said bridge; means including a variable resistance in an arm of said bridge; means operable at speeds corresponding to speeds of the vehicle; means actuated by the last-named means for controlling said variable resistance and thereby the direction of said flow of current in said bridge current; and a manually variable resistance in opposition to said last-named resistance for modifying the speed at which said control is effected.

4. In a speed-indicating device for vehicles, a signal circuit; a circuit including a Wheatstone bridge having in one arm a variable resistance; means operable at speeds corresponding to speeds of the vehicle; means actuated by the last-named means for changing said resistance in accordance with changes in speed of the vehicle; means operable upon a predetermined directional unbalance in said bridge circuit for effecting a control of said signal circuit; and a manually variable resistance in another arm of said bridge for modifying the unbalance in said bridge circuit by changes in said first-named resistance.

5. In a speed-indicating device for vehicles comprising a plurality of resistor elements connected to form a Wheatstone bridge; means operable at speeds corresponding to speeds of the vehicle; means actuated by the last-named means for changing the resistance of one of said elements; a signal circuit; means responsive to reversal of the difference in potential across said bridge for effecting a control of said signal circuit; and means for manually changing the resistance of another of said elements for effecting a change in the balance of said bridge in opposition to the change in response to the speed of the vehicle for adjusting the speed at which the signal circuit will be controlled.

6. In a speed-indicating device for motor vehicles having a motor and a fan operated thereby; a vane responsive to the air currents produced by said fan; a circuit including a Wheatstone bridge having in one arm thereof a continuously variable resistance; means interconnecting said variable resistance and said vane, whereby movement of the vane in response to the air currents produced by the fan varies the said resistance; a signal circuit including a switch therefor; and a polarized relay connected across the terminals of said bridge and adapted to be actuated by a change in the direction of current flow across the bridge for controlling the switch in said signal circuit.

7. In a speed-indicating device for motor vehicles, the combination with a motor compartment and driver's compartment; a motor and a fan operated thereby in the motor compartment; a vane in the motor compartment responsive to the air currents produced by said fan; a circuit including a Wheatstone bridge having in one arm thereof a continuously variable resistance; means interconnecting said variable resistance and said vane, whereby movement of the vane in response to the air currents produced by the fan varies the said resistance; a signal circuit including a switch therefor; a polarized relay connected across said bridge and adapted to be actuated by a change in the direction of current flow across the bridge, said relay controlling the switch in said signal circuit; and means in said driver's compartment including a manually variable resistance in another arm of the bridge for adjusting the balance of the bridge to determine the potential difference across said bridge for predetermined speeds, whereby the speed at which said signal will be actuated may be adjusted.

8. In a speed-indicating device for motor vehicles having a motor and a fan operated thereby; a vane responsive to the air currents produced by said fan; a circuit including a Wheatstone bridge having in one arm thereof a continuously variable resistance; means interconnecting said variable resistance and said vane, whereby movement of the vane in response to the air currents produced by the fan varies the said resistance; a signal circuit including a switch therefor; a polarized relay connected across the terminals of said bridge and adapted to be actuated by a change in the direction of current flow across the bridge for controlling the switch in said signal circuit; a variable resistance in an opposing arm of said bridge; and manually adjustable means for varying the value of said last-named resistance for varying the speed at which the value of said vane controlled resistance causes a change in the direction of current flow across the terminals of the bridge.

ARTHUR A. JOHNSON.